(12) United States Patent
Vanzetto et al.

(10) Patent No.: US 11,383,261 B2
(45) Date of Patent: Jul. 12, 2022

(54) VALVE, SYSTEM FOR APPLICATION OF COVERING PRODUCT INCLUDING SUCH A VALVE AND DEDICATED MOUNTING AND DISMOUNTING TOOL

(71) Applicant: EXEL INDUSTRIES, Epernay (FR)

(72) Inventors: Denis Vanzetto, Paris (FR); Didier Faure, Paris (FR); Olivier Gourbat, Paris (FR)

(73) Assignee: EXEL INDUSTRIES, Epernay (FR)

( * ) Notice: Subject to any disclaimer, the term of this patent is extended or adjusted under 35 U.S.C. 154(b) by 155 days.

(21) Appl. No.: 17/007,336

(22) Filed: Aug. 31, 2020

(65) Prior Publication Data

US 2021/0060599 A1    Mar. 4, 2021

(30) Foreign Application Priority Data

Sep. 2, 2019   (FR) ...................................... 1909623

(51) Int. Cl.
*B05B 15/65* (2018.01)
*B05B 1/30* (2006.01)
(Continued)

(52) U.S. Cl.
CPC ............ *B05B 15/65* (2018.02); *B05B 1/3006* (2013.01); *B05B 1/3013* (2013.01);
(Continued)

(58) Field of Classification Search
CPC ..... B05B 15/65; B05B 1/3013; B05B 1/3046; B05B 1/3006; B05B 1/3026; B05B 1/326;
(Continued)

(56) References Cited

U.S. PATENT DOCUMENTS

2004/0144872 A1 * 7/2004 Scotchmur .............. B05B 7/066
239/583
2016/0341589 A1 * 11/2016 Doering .................. B05B 15/65

FOREIGN PATENT DOCUMENTS

FR          2416057 A1    8/1979
WO     1990008267 A1    7/1990
(Continued)

OTHER PUBLICATIONS

INPI Rapport de Recherche Préliminaire for Patent Application No. FR 2000018, May 12, 2020, 2 pp.

*Primary Examiner* — Steven J Ganey
(74) *Attorney, Agent, or Firm* — Soquel Group LLC

(57) ABSTRACT

Valve for a system for applying a covering product, including projecting or recessed shapes on a peripheral part, configured to cooperate with projecting or recessed shapes of a dedicated mounting and dismounting tool, these projecting or recessed shapes of the valve being configured to transmit a rotational movement to the valve, and to be secured to the tool. The projecting or hollow shapes of the valve include a first peripheral profile having at least one planar surface, and a second peripheral profile located behind the first profile relative to an outer end of the valve. The second profile has at least one first planar surface aligned with the planar surface of the first profile, and at least one second planar surface angularly offset relative to the planar surface of the first profile, such that the second planar surface of the second profile forms a shoulder relative to the first profile.

4 Claims, 8 Drawing Sheets

(51) Int. Cl.
  *B25B 13/50* (2006.01)
  *B25B 27/24* (2006.01)
  *B05B 1/32* (2006.01)
  B05B 9/04 (2006.01)
  B05B 9/043 (2006.01)

(52) U.S. Cl.
  CPC .......... *B05B 1/3026* (2013.01); *B05B 1/3046* (2013.01); *B05B 1/326* (2013.01); *B25B 13/50* (2013.01); *B25B 27/24* (2013.01); *B05B 9/043* (2013.01); *B05B 9/0413* (2013.01)

(58) Field of Classification Search
  CPC ....... B05B 9/043; B05B 9/0413; B25B 13/50; B25B 27/14
  USPC .......................... 239/533.1, 533.15, 583, 600
  See application file for complete search history.

(56) References Cited

FOREIGN PATENT DOCUMENTS

| | | | |
|---|---|---|---|
| WO | 2008001393 | A1 | 1/2008 |
| WO | 2015063295 | A1 | 5/2015 |

\* cited by examiner

US 11,383,261 B2

VALVE, SYSTEM FOR APPLICATION OF COVERING PRODUCT INCLUDING SUCH A VALVE AND DEDICATED MOUNTING AND DISMOUNTING TOOL

CROSS-REFERENCE TO RELATED APPLICATION

This application claims priority of French Patent Application No. 19 09623, filed on Sep. 2, 2019.

FIELD OF THE INVENTION

The present invention relates to a valve and a system for application of a covering product comprising such a valve. The invention also relates to a dedicated mounting and dismounting tool for such a valve.

BACKGROUND OF THE INVENTION

Systems for application of covering products, such as paint sprayers, include at least one valve controlling a needle maneuverable to allow circulation of paint. The valve is generally controlled by injecting pressurized control air into a chamber. The pressurized air acts on a piston controlling the needle. Such a valve includes sealing devices preventing the paint from entering the valve toward the chamber on the one hand, and preventing the pressurized control air from escaping from the chamber and other fluids from entering the chamber on the other hand.

Such valves, as well as other types of valves, must be mounted or dismounted under access conditions that are sometimes complicated. Sometimes, several types of tools, or a tool that must be turned over, must be used, which involves increased manipulation times if, for example, a tool falls during the manipulations, or if one of the necessary tools is not available. During such manipulations, there is also a risk of dropping the valve during mounting or dismounting.

SUMMARY OF THE DESCRIPTION

The invention aims to address these drawbacks by proposing a new valve for a system for the application of a covering product, which has shapes making it possible to facilitate its mounting and dismounting with a single tool, while reducing the fall risks.

To that end, the invention relates to a valve for a system for application of a covering product, including projecting or recessed shapes on a peripheral part, configured to cooperate with projecting or recessed shapes of a dedicated mounting and dismounting tool, these projecting or recessed shapes of the valve being configured to transmit a rotational movement to the valve, and to be secured to the tool. This valve is characterized in that the projecting or recessed shapes of the valve include a first peripheral profile having at least one planar surface, and a second peripheral profile located behind the first profile relative to an outer end of the valve, and the second profile has at least one first planar surface aligned with the planar surface of the first profile and at least one second planar surface that is angularly offset relative to the planar surface of the first profile such that the second planar surface of the second profile forms a shoulder relative to the first profile.

Owing to the invention, the valve can be both screwed and unscrewed with the same tool, to which the valve is secured. This reduces the manipulation time, the number of tools needed, and the fall risk of the valve.

According to advantageous but optional aspects of the invention, such a valve may incorporate one or more of the following features, considered in any technically allowable combination:

The first peripheral profile includes three planar surfaces, and the second peripheral profile includes three planar surfaces that are aligned with the three planar surfaces of the first peripheral profile, and three planar surfaces that are angularly offset relative to the three planar surfaces of the first peripheral profile.

The invention also relates to an application system of a covering product including a valve as mentioned above.

The invention also relates to a dedicated tool for mounting and dismounting a valve as mentioned above, including projecting or recessed shapes on a peripheral part, configured to cooperate with the projecting or recessed shapes provided on the peripheral part of the valve, these projecting or recessed shapes being configured to transmit a rotational movement to the valve, and to be secured to the valve. This tool is characterized in that the projecting or recessed shapes of the tool are provided on an inner peripheral surface of a bore of the tool, and include one or several planar peripheral surfaces, and a radial withdrawn groove of the one or several planar peripheral surfaces of the tool, this groove being configured to receive part of the valve by securing the valve with the tool, and in that the groove includes a resilient peripheral element exerting a resilient axial force against the part of the valve received in the groove.

BRIEF DESCRIPTION OF THE DRAWINGS

The invention will be better understood, and other advantages thereof will appear more clearly, in light of the following description of a valve, a system for application of a covering product and a tool according to its principle, provided as a non-limiting example and in reference to the drawings, in which.

DETAILED DESCRIPTION

Figure 1:
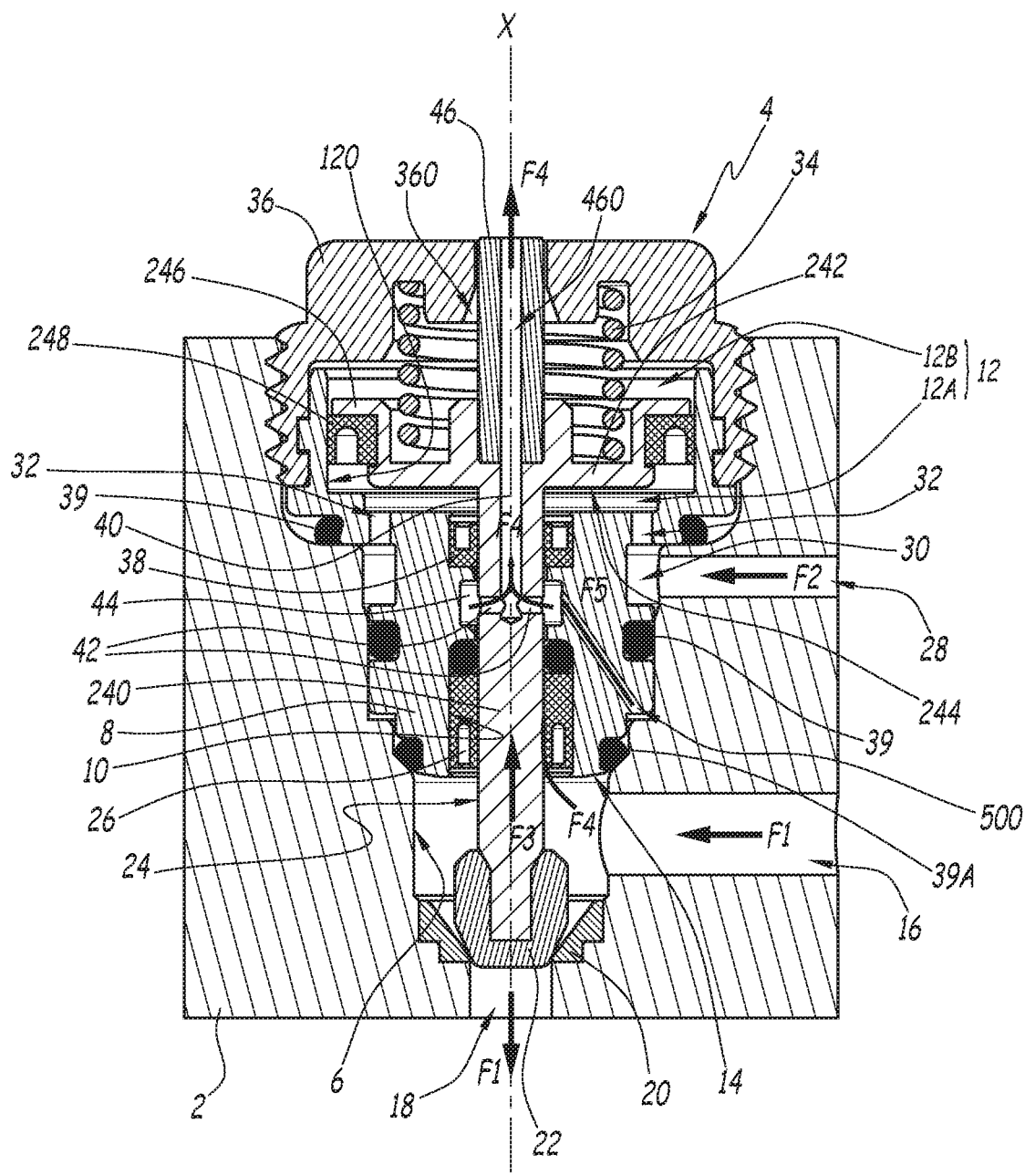
FIG. 1 shows a sectional view of a valve according to the invention mounted in a spraying system according to the invention.
Figure 2:
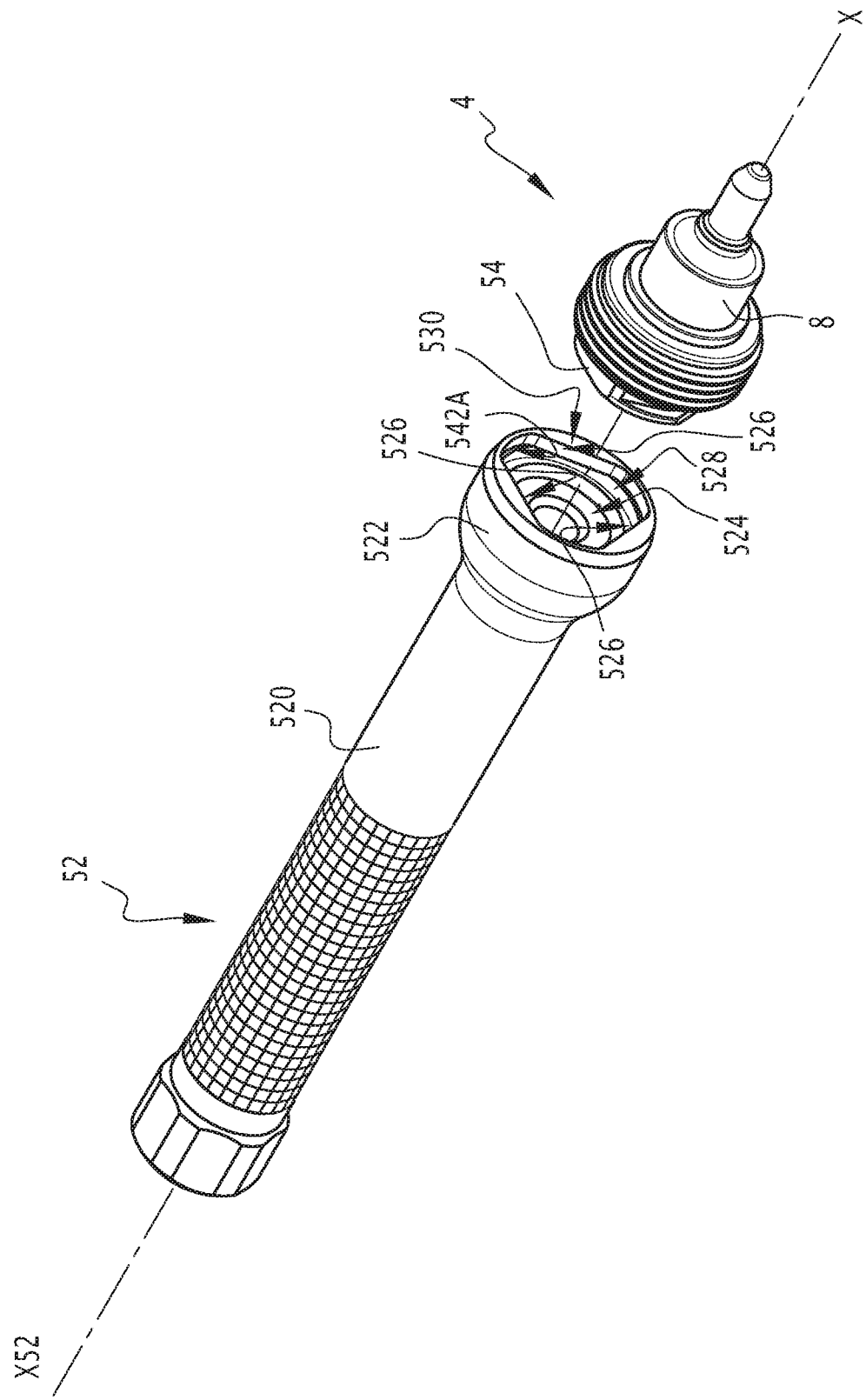
FIG. 2 is a perspective view of the valve of FIG. 1 and a tool according to the invention.

FIG. 1 shows part of a system 2 for application of a covering product; for example, a sprayer for paint, varnish, anticorrosion covering, or any other conceivable type of product. System 2 includes a valve 4 mounted in a bore 6 of system 2.

Valve 4 includes a body 8 comprising an inner central orifice 10 and a chamber 12. Orifice 10 and chamber 12 are centered about a central axis X. Hereinafter, the terms "axial", "radial", "axially" and "radially" are used in reference to central axis X.

Orifice 10 and chamber 12 communicate fluidly. Orifice 10 emerges from body 8 at an end face 14 of body 8, in bore 6.

System 2 includes a fluid intake duct 16 in bore 6, and a fluid outlet duct 18 that extends orifice 6. In some applications, the intake duct and the outlet duct may be reversed. Intake duct 16 and outlet duct 18 are primarily intended for the circulation of the covering product, but other fluids, in particular air or cleaning solvent, may also circulate in intake duct 16 and outlet duct 18.

Between intake duct 16 and outlet duct 18, bore 6 includes a seat 20, against which a needle 22 of valve 4 cooperates so as to close or allow circulation of covering product from intake duct 16 to outlet duct 18, along arrows F1. In a variant that is not shown, seat 20 may also be machined directly in the material of application system 2. Intake duct 16 is connected to a covering product reservoir, not shown, or to a pump, in particular of the "circulating" type, and outlet duct 18 is connected to an application or spraying device, not shown, such as a gun.

Valve 4 includes a piston 24 formed by a rod 240 mounted in inner orifice 10 and by a piston head 242 housed in chamber 12. Rod 240 extends outside body 8 and bears needle 22. Rod 240 is intended to be translated along central axis X in bore 6 in which the pressurized covering product circulates along arrows F1.

Valve 4 includes a first sealing device 26 housed in body 8 around piston rod 240, on the side of valve 4 where rod 240 extends outside body 8. First sealing device 26 is a dynamic seal making it possible to prevent covering product from infiltrating between piston rod 240 and body 8 toward chamber 12, during translational movements of piston rod 240.

Piston head 242 has an axial surface 244 perpendicular to central axis X. Piston head 242 extends radially in a skirt 246 in which a sealing device 248 is housed, which guarantees dynamic sealing between piston head 242 and an inner cylindrical wall 120 of chamber 12, during translational movements of piston head 242 in chamber 12. Sealing device 246 divides chamber 12 into two parts 12A and 12B that are fluidly isolated because sealing device 246 prevents fluid from circulating around piston head 242 between part 12A and part 12B.

Part 12A of chamber 12 is located on the side of piston rod 240. Axial surface 244 is located in part 12A. Spraying system 2 includes an intake duct 28 for a pressurized control fluid, which emerges in a peripheral groove 30 of body 8. Peripheral groove 30 communicates with part 12A by axial orifices 32. Part 12A of chamber 12 is intended to be filled with the pressurized control fluid, for example air, so as to control axial movement of piston 24. Valve 4 includes a spring 34 mounted in part 12B of chamber 12. Spring 34 is centered on central axis X and exerts a resilient force on piston head 242 so as to drive the latter downward, i.e., to push it into part 12A. Spring 34 bears against a part of piston head 242 and against a stopper 36 of valve 4, which is fastened to body 8 and screwed in application system 2.

Under the control action of the compressed air injected into part 12A via duct 28 (arrow F2), piston 24 is moved upward (arrow F3) by the force exerted by the pressure of the pressurized air on axial surface 244, against the force of spring 34. This results in lifting needle 22 off of seat 20 and allowing the passage of covering product toward the outlet duct 18.

Valve 4 includes a second sealing device 38 housed in body 8 around piston rod 240, between first sealing device 26 and chamber 12. Sealing device 38 is a dynamic seal that prevents air from leaving chamber 12 during translation of piston rod 240, as well as preventing other fluids from entering part 12A, the pressurized control air circuit necessarily having to be preserved from any intrusion of outside fluid, in particular covering product.

Valve 4 also includes several static sealing devices ensuring tightness between bore 6 and body 8. These devices are formed by O-rings 39 housed in grooves of body 8 and which bear against bore 6, in particular an O-ring 39A ensuring tightness between bore 6 and body 8 around end face 14.

In the case where first sealing device 26 experiences a failure, which may cause a leak and the inflow of covering product toward chamber 12, valve 4 includes a vent duct 40 making it possible to discharge the covering product that has leaked toward a location separate from part 12A of chamber 12.

Vent duct 40 is provided in piston rod 240 and communicates with inner central orifice 10 between first sealing device 26 and second sealing device 38 and emerges in the open air or in part of chamber 12 communicating with the open air. Vent duct 40 is formed by a duct encompassed in the material forming piston rod 240. Thus, vent 40 is provided in valve 4 itself, which does not require a vent channel in application system 2. The defective valve may be changed without it being necessary to intervene on the application system.

In one embodiment, vent duct 40 is coaxial to central axis X of piston 24. Vent duct 40 includes at least one radial orifice 42 emerging in a cavity 44 of inner central orifice 10, located axially between first sealing device 26 and second sealing device 38. Thus, any leak of covering product passing through first sealing device 26 accumulates in cavity 44, then rejoins vent duct 40 via radial orifices 42, along arrows F4. Vent duct 40 may include several radial orifices 42 distributed around central axis X.

Valve 4 includes an indicator 46, formed by a part secured to piston 24 and configured to protrude outside of body 8 based on the axial position of piston 24. Indicator 46 is a cylindrical part coaxial to central axis X, fastened to piston head 242, and which is inserted into a hole 360 of stopper 36. When piston 24 is pushed upward under the action of the compressed control air, indicator 46 protrudes outside of stopper 36 and is visible from the outside.

In the illustrated example, vent duct 40 extends in a piercing 460 that passes through indicator 46, and the covering product that has leaked through vent duct 40 is therefore expelled to the open air along arrows F4. If first sealing device 26 fails, a covering product leak is therefore discharged to the open air through piston rod 240, then indicator 46, i.e., components of valve 4, without passing through spraying device 2. This does not require a specific valve that must be cleaned in case of leak. Furthermore, the covering product is oriented via vent 40 away from part 12A to prevent contamination of the control air circuit.

According to one variant that is not shown, vent duct 40 cannot be coaxial to central axis X, and cannot cross indicator 46 to expel the covering product into the open air. For example, the vent duct may follow a path inside piston rod 240 and piston head 242, which emerges in part 12B of chamber 12. Part 12B communicates with the open air via hole 360 of stopper 36, through which indicator 46 slides along central axis X. The covering product may therefore be discharged from part 12B via hole 360. A certain quantity of covering product that has leaked may accumulate around indicator 46 and spring 34, and advantageously block valve 4 in the closed position. Part 12A remains protected from the covering product leak by dynamic sealing device 248. The blocking of valve 4 in the closed position results in quickly indicating a malfunction of valve 4.

According to a variant that is not shown, indicator 46 may also not be coaxial to central axis X. Indicator 46 may also not be a separate part from piston 24. Indicator 46 and piston 24 may be integral and form a monobloc part passed all the way through by vent duct 40 between radial orifices 42 and the open air at stopper 36.

According to one optional aspect, valve 4 may include a piercing 500 passing through body 8 between bore 6 and cavity 44. The opening of piercing 500 is provided behind seal 39A relative to end face 14. Thus, in case of a sealing problem at seal 39A, a leak between an outer surface of body 8 and bore 6 is channeled by piercing 500 and oriented toward cavity 44, along arrow F5, then toward radial orifices 42 and vent duct 40.

Another aspect of valve 4, a tool 52 for mounting and dismounting valve 4 and operation of tool 52 are described in reference to FIGS. 2-8.

Valve 4 includes projecting or recessed shapes on a peripheral part, configured to cooperate with projecting or recessed shapes of tool 52. These projecting or recessed shapes are configured to transmit a rotational movement to valve 4, and to be secured to tool 52 during dismounting of valve 4. The peripheral part is formed by a stopper 54 with a particular shape shown in FIG. 3, the primary function of which is similar to that of stopper 36 of FIG. 1: stopper 54 is fastened to body 8 and screwed in application system 2. To that end, stopper 54 includes an outer thread 540.

The projecting or hollow shapes provided on stopper 54 include a peripheral profile 542 and a peripheral profile 544, located behind peripheral profile 542 relative to an outer end 546 of valve 4 borne by an axial surface of stopper 54. Peripheral profiles 542 and 544 are staged along axis X, peripheral profile 542 being closest to end 546.

Figure 3:
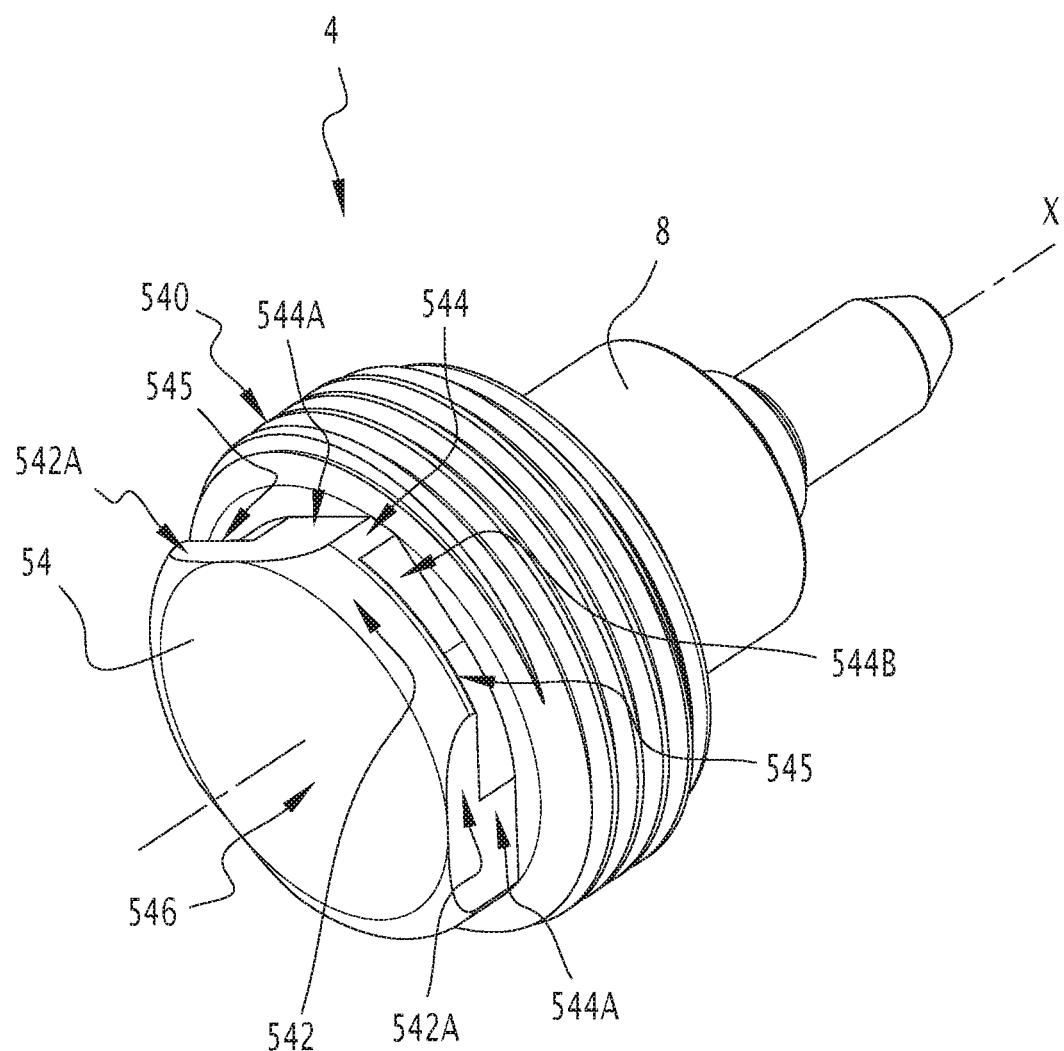
FIG. 3 is a perspective view of the valve from an opposite angle relative to FIG. 2.

Peripheral profile 542 has three planar surfaces 542A, which extend parallel to axis X, and form breaks in the cylindrical shape of stopper 54. Peripheral profile 544 includes three planar surfaces 544A that are aligned with the three planar surfaces 542A of peripheral profile 542, and three planar surfaces 544B that are angularly offset relative to the three planar surfaces 542A. "Aligned" means that planar surfaces 544A are located at least partially in the extension along axis X of planar surfaces 542A and form a same plane. "Angularly offset" means that the surfaces 544B are located in angular sectors that are offset relative to the angular sectors in which planar surfaces 542A extend, such that the respective planes formed by planar surfaces 542A and 544B are secant. This angular offset makes it possible for planar surfaces 544B to form axial shoulders 545 that are recessed relative to peripheral profile 542. As shown in FIG. 3, planar surfaces 544B are withdrawn from the cylindrical part of peripheral profile 542.

Tool 52 includes projecting or recessed shapes on a peripheral part, configured to cooperate with the projecting or recessed shapes provided on the stopper of valve 4. These projecting or recessed shapes of tool 52 are configured to transmit a rotational movement to valve 4, and to be secured to valve 4, during a mounting or dismounting of valve 4.

Tool 52 extends along a central axis X52 and includes a handle 520 and an endpiece 522 having a bore 524. The projecting or hollow shapes of tool 52 are provided on an inner peripheral surface 524A of bore 524. Inner peripheral surface 524A includes three planar peripheral surfaces 526, equal to the number of planar surfaces 542A of peripheral profile 542 of valve 4. Planar surfaces 526 are parallel to axis X52 in the same way that surfaces 542A are parallel to axis X. Peripheral surface 524A also includes a groove 528 radially withdrawn from planar peripheral surfaces 526. Groove 528 is located behind planar surfaces 526 relative to a front end 530 of tool 52. Groove 528 forms an axial shoulder 527 configured to receive part of valve 4 by securing valve 4 with tool 52.

Groove 528 includes a resilient element 529 that exerts, when valve 4 is received in tool 52, a resilient force oriented along axis X52 against the part of valve 4 that is received in groove 528. Resilient element 529 may, for example, be an O-ring. In a variant that is not shown, resilient element 529 may also be a spiral spring or a lock washer (Belleville washer).

In a variant that is not shown, peripheral profile 542 may include a different number of planar surfaces, more generally at least one planar surface. Likewise, peripheral profile 544 may have a number of planar surfaces aligned with the planar surfaces of peripheral profile 542 different from three, more generally at least one, and at least one planar surface that is angularly offset relative to the planar surface(s) of peripheral profile 542. As for the planar surfaces of peripheral profiles 542 and 544, tool 52 may have a number of planar surfaces 526 different from three, more generally at least one planar surface.

Figure 4:
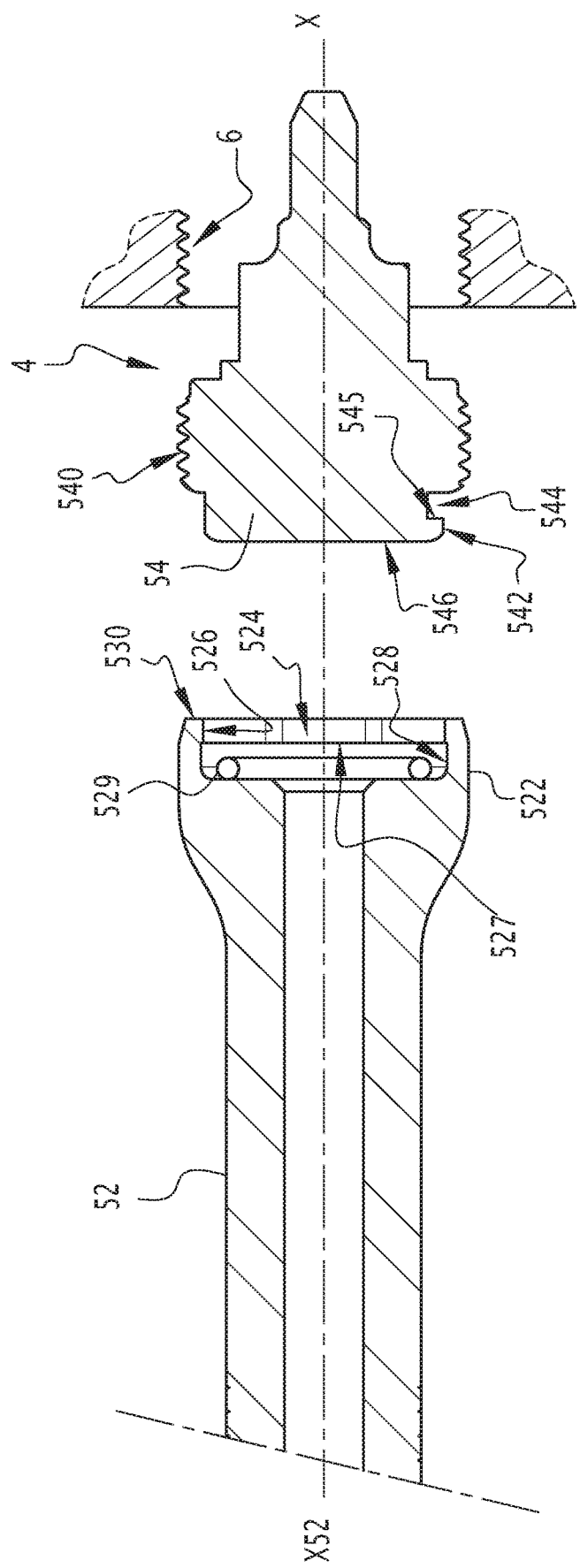
FIG. 4 is a longitudinal sectional view of the valve and the tool as shown in FIG. 2.
Figure 5:
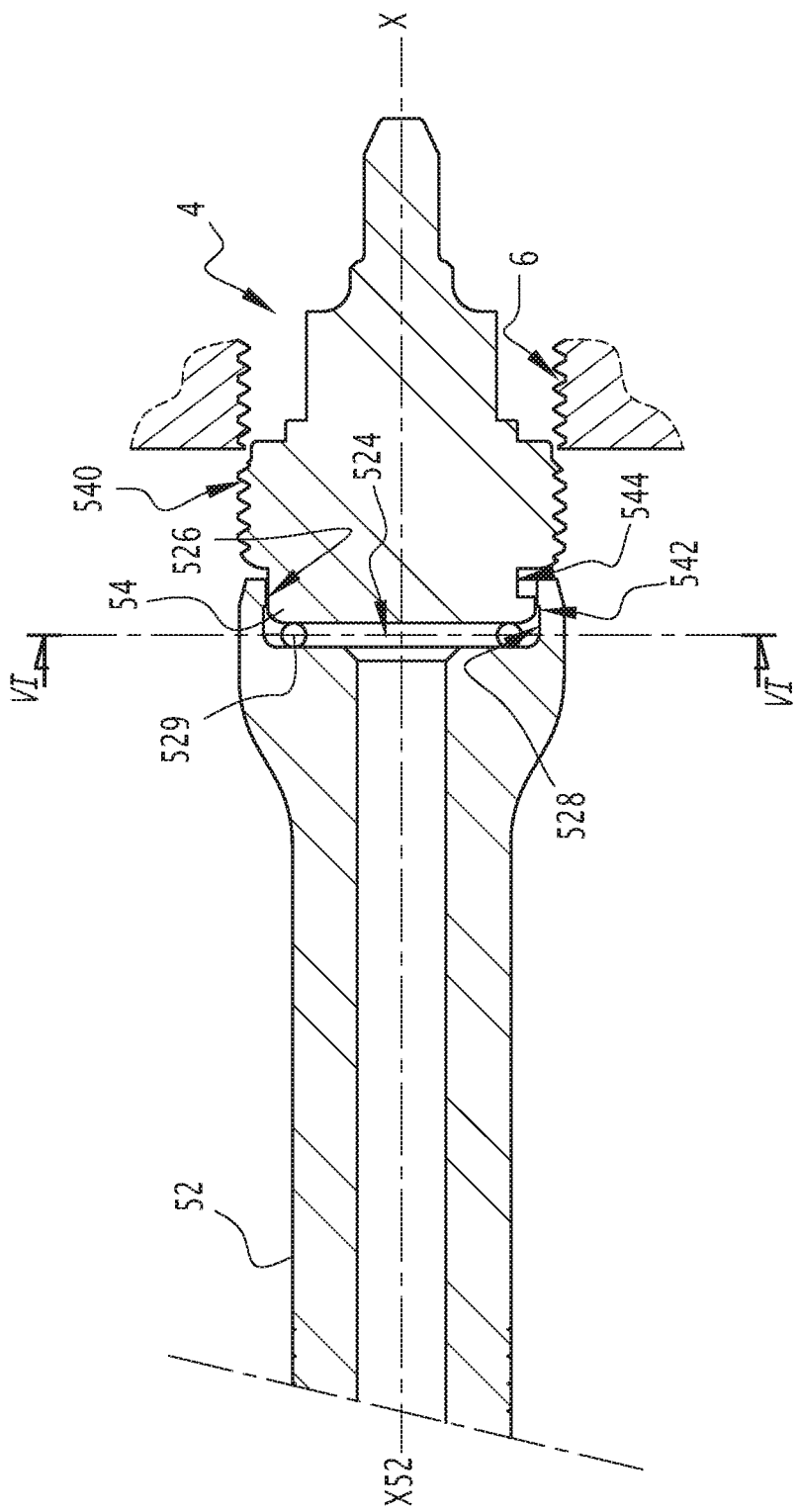
FIG. 5 is a longitudinal sectional view of the valve engaged in the tool in a mounting configuration.
Figure 6:
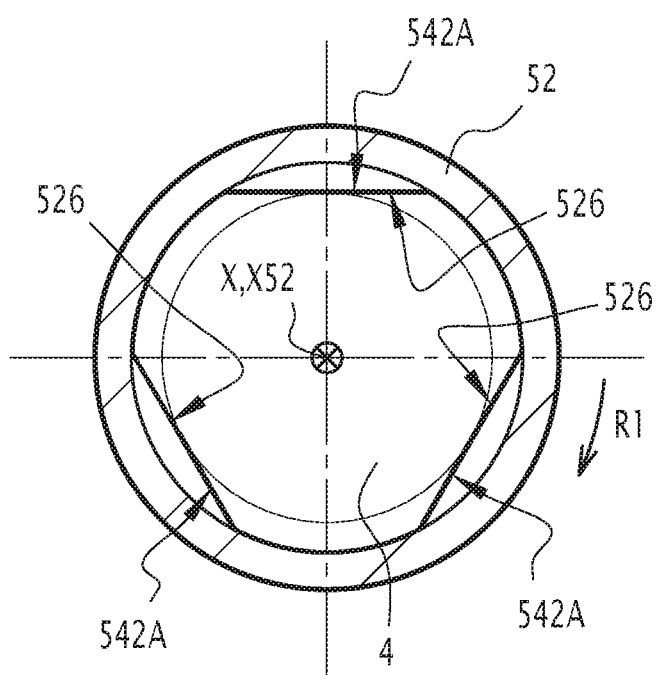
FIG. 6 is a cross-sectional view of the tool and the valve along plane VI.

The operation of tool 52 with valve 4 is described hereinafter. FIGS. 4, 5 and 6 show the mounting of valve 4 in its housing. Valve 4 is positioned in its bore 6, then tool 52 is brought closer to valve 4 such that axes X and X52 are combined (FIG. 4).

When endpiece 522 is pushed into stopper 54 (FIG. 5) such that peripheral profile 542 is at least partially axially aligned with planar surfaces 526, planar surfaces 542A and 544A cooperate by planar contact with planar surfaces 526 (FIG. 6, in which resilient element 529 is omitted). By imparting a rotational screwing movement along arrow R1 to tool 52, an operator may thus screw valve 4 into bore 6.

Figure 7:
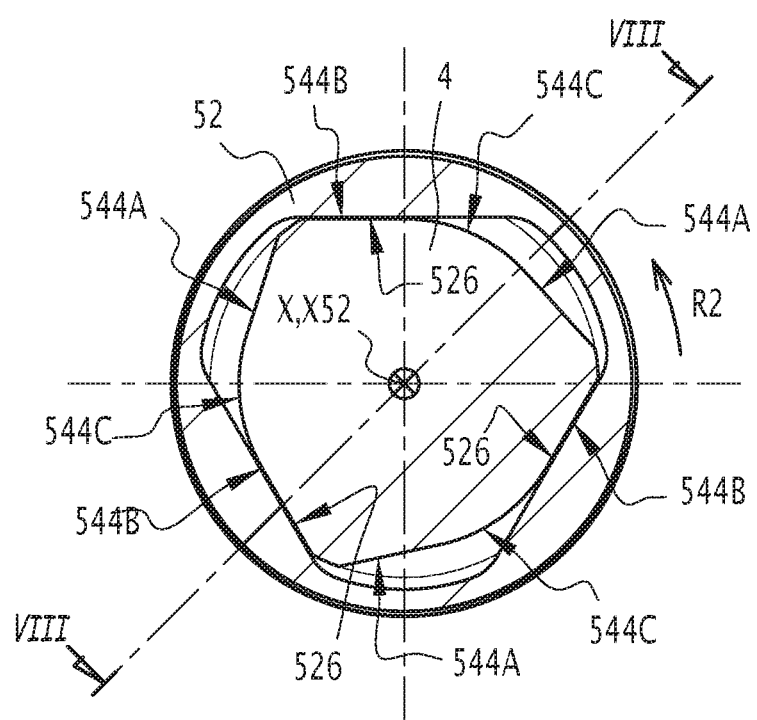
FIG. 7 is a cross-sectional view of the valve and the tool mounted along plane VII in FIG. 8.
Figure 8:
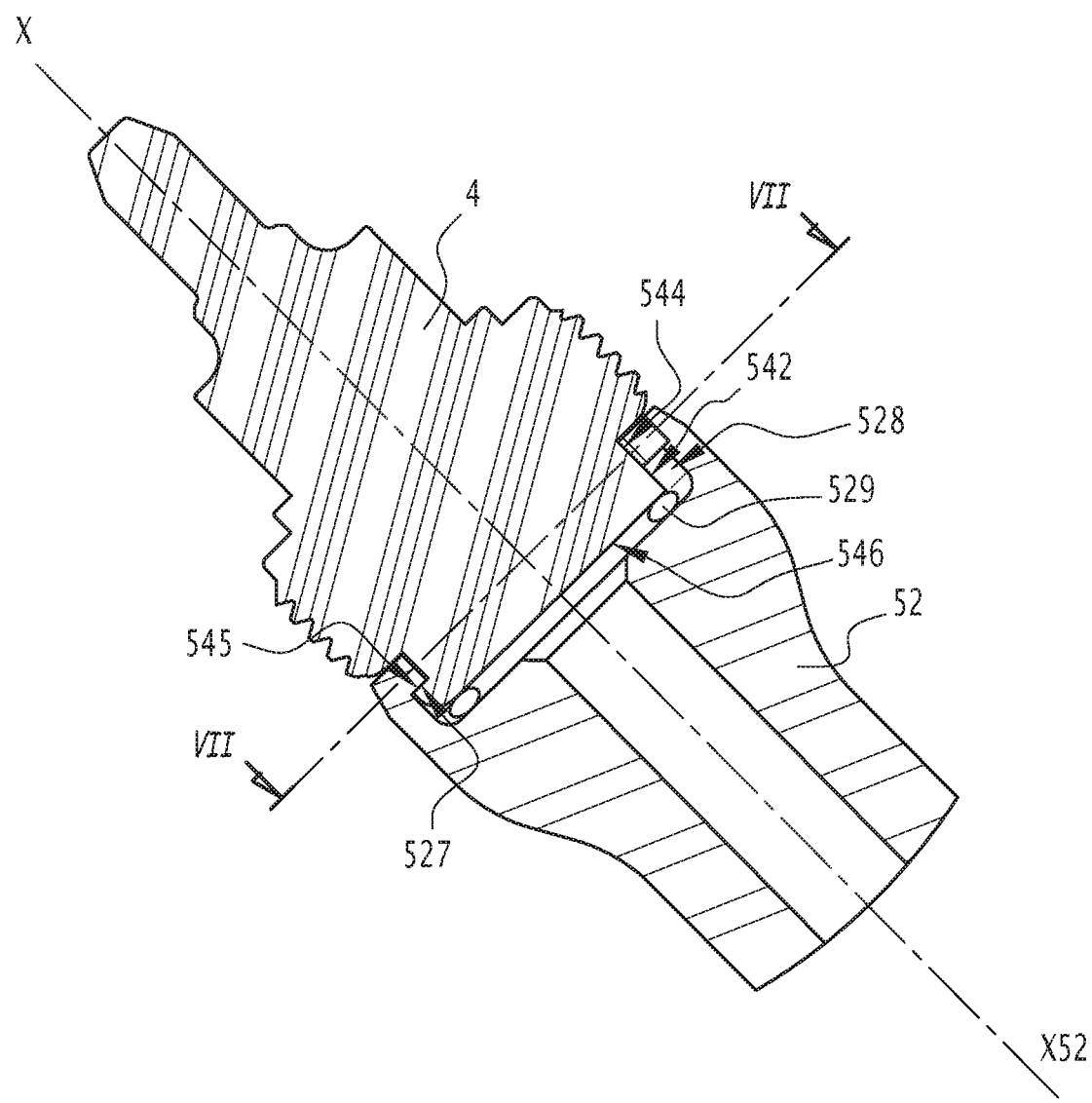
FIG. 8 is a longitudinal sectional view along plane VIII of the mounted valve and tool.

When the operator wishes to unscrew valve 4 and remove it, he pushes tool 52 in more deeply, such that resilient element 529 is crushed. Peripheral profile 542 is axially aligned with groove 528 (FIG. 8). Next, the operator exerts a rotation in the unscrewing direction along arrow R2, such that surfaces 526 pivot around axis X until they come into planar contact with planar surfaces 544B (FIG. 7). This rotation is enabled by the fact that peripheral profile 544 has, at the junction of planar surfaces 544A and 544B, rounded surfaces 544C that allow rotation in the unscrewing direction.

In this configuration, peripheral profile 542 is blocked in groove 528 by insertion of planar surfaces 526 of tool 52 into the withdrawn reliefs formed by peripheral profile 544. Shoulders 527 of tool 52 then axially oppose shoulders 545 of valve 4 and prevent removal of tool 52 from valve 4. The resilient force exerted by resilient element 529 tends to push valve 4 back outside of bore 544 and therefore locks the contact between shoulders 527 and 545. Valve 4 and tool 52 then form an integral assembly. Valve 4 and tool 52 form a "bayonet" assembly.

By continuing the rotation in the unscrewing direction, the operator exerts planar contact between surfaces 526 and 544B, which makes it possible to unscrew valve 4. Once it is unscrewed from bore 6, valve 4 may be easily removed, even from a hard-to-reach location, since valve 4 stays attached to endpiece 522 of tool 52. Valve 4 stays secured to tool 52 and does not risk falling.

This possibility of attachment of valve 4 to endpiece 522 may also be used during assembly of valve 4 in a hard-to-reach location. The operator may fasten valve 4 to tool 52 before the mounting, by pushing tool 52 into bore 524, then turning tool 52 in the unscrewing direction. After having mounted valve 4 in its bore 6, the operator then turns tool 52 in the screwing direction. Valve 4 then rotates freely and screws itself until the screwing meets with resistance. The rotational torque of tool 52 then overcomes the force exerted by the resilient element, and tool 52 rotates relative to valve 4 until cooperation is obtained of surfaces 526 with surfaces 542A and 544A. The screwing may then be continued until locking.

Tool 52 and the recessed/projecting reliefs provided on valve 4 therefore make it possible to use the same tool for mounting and dismounting of the valve. Because the means allowing mounting and dismounting are both provided on a same endpiece 522 of tool 52, it is not necessary to rotate tool 52 in order to perform either operation. The possibility of securing valve 4 and tool 52 by a bayonet assembly makes it possible to mount or dismount valve 4 easily in hard-to-reach locations. The unscrewing of the valve and its removal may in particular be done in a single operation, unlike known techniques in which the unscrewing and removal are done with two different tools that sometimes require tedious exchanges if the valve is not unscrewed enough.

The features of the embodiments and alternatives described above may be combined to form new embodiments of the invention in the context of the claims.

The invention claimed is:

1. A valve for a system for application of a covering product, comprising projecting or recessed shapes on a peripheral part, configured to cooperate with projecting or recessed shapes of a dedicated mounting and dismounting tool, said projecting or recessed shapes of the valve being configured to transmit a rotational movement to the valve, and to be secured to the tool, wherein the projecting or recessed shapes of the valve comprise:
   a first peripheral profile having at least one planar surface; and
   a second peripheral profile located behind said first peripheral profile relative to an outer end of the valve, and wherein the second peripheral profile has at least one first planar surface aligned with the planar surface of said first peripheral profile, and at least one second planar surface that is angularly offset relative to the planar surface of said first peripheral profile, such that the second planar surface of the second peripheral profile forms a shoulder relative to said first peripheral profile.

2. The valve according to claim 1, wherein said first peripheral profile comprises three planar surfaces, and wherein said second peripheral profile comprises:
   three planar surfaces that are aligned with said three planar surfaces of said first peripheral profile; and
   three planar surfaces that are angularly offset relative to said three planar surfaces of said first peripheral profile.

3. An application system of a covering product comprising a valve according to claim 1.

4. A dedicated tool for mounting and dismounting a valve according to claim 1, comprising projecting or recessed shapes provided on an inner peripheral surface of a bore of the tool, configured to cooperate with the projecting or recessed shapes provided on the peripheral part of the valve, the projecting or recessed shapes of the tool being configured to transmit a rotational movement to the valve, and to be secured to the valve, the projecting or recessed shapes of the tool comprising:
   one or several planar peripheral surfaces; and
   a radial withdrawn groove of said one or several planar peripheral surfaces of the tool, the groove being configured to receive part of the valve by securing the valve with the tool, wherein the groove comprises a resilient peripheral element exerting a resilient axial force against the part of the valve received in the groove.

* * * * *